(12) United States Patent
Klotz et al.

(10) Patent No.: US 7,343,996 B2
(45) Date of Patent: Mar. 18, 2008

(54) VEHICLE COMPRISING AT LEAST ONE SENSOR FOR DETECTING THE SURROUNDING AREA OF THE VEHICLE

(75) Inventors: Albrecht Klotz, Tuebingen (DE); Michael Weilkes, Sachsenheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 10/433,545

(22) PCT Filed: Dec. 5, 2001

(86) PCT No.: PCT/DE01/04527

§ 371 (c)(1),
(2), (4) Date: Nov. 20, 2003

(87) PCT Pub. No.: WO02/45990

PCT Pub. Date: Jun. 13, 2002

(65) Prior Publication Data

US 2004/0065493 A1 Apr. 8, 2004

(30) Foreign Application Priority Data

Dec. 5, 2000 (DE) ................................. 100 60 288

(51) Int. Cl.
*B62D 1/24* (2006.01)
(52) U.S. Cl. ..................................................... 180/169
(58) Field of Classification Search ................ 180/167, 180/168, 169
See application file for complete search history.

(56) References Cited

U.S. PATENT DOCUMENTS 4,709,402 A * 11/1987 Akerberg .................... 455/503
4,757,450 A * 7/1988 Etoh ............................ 701/96
4,846,297 A * 7/1989 Field et al. .................. 180/169
5,332,057 A * 7/1994 Butsuen et al. .............. 180/169
5,808,728 A * 9/1998 Uehara ........................ 356/5.01
6,275,772 B1 * 8/2001 Sugimoto et al. ........... 701/301
6,323,763 B1 * 11/2001 Bohner et al. ............... 340/436
6,671,037 B2 * 12/2003 Isogai et al. ................ 356/4.01

FOREIGN PATENT DOCUMENTS

| DE | 69325455D | 7/1999 |
|----|-----------|--------|
| DE | 198 31 071 | 1/2000 |
| DE | 19948365 | 5/2000 |
| DE | 100 29 710 | 1/2001 |
| JP | 405203746 A * | 8/1993 |
| JP | 05 266 400 | 10/1993 |
| JP | 5266400 | 10/1993 |
| JP | 407105497 A * | 4/1995 |
| JP | 10 289 400 | 10/1998 |
| JP | 10289400 | 10/1998 |
| JP | 02000233699 A * | 8/2000 |
| JP | 2000291464 | 10/2000 |

* cited by examiner

*Primary Examiner*—Christopher P. Ellis
*Assistant Examiner*—Bridget Avery
(74) *Attorney, Agent, or Firm*—Kenyon & Kenyon LLP

(57) ABSTRACT

A vehicle is described, having at least one sensor for detecting the vehicle environment and having a motion-state actuator for acting on the motion state of the vehicle, the motion-state actuator being provided to act on the motion state of the vehicle in the event of activation of the motion-state actuator, the information detected by the sensor being provided for activating the motion-state actuator when it is intended for the vehicle to turn off and traffic is obstructing such a turning-off action.

7 Claims, 1 Drawing Sheet

VEHICLE COMPRISING AT LEAST ONE SENSOR FOR DETECTING THE SURROUNDING AREA OF THE VEHICLE

BACKGROUND INFORMATION

Current electronic stability programs are based exclusively on information about the driver input, the driving condition of the vehicle, and the frictional adhesion potential between the tires and the road. Not included in these programs is how the vehicle is embedded in its environment—in relation to lanes and other objects.

Adaptive cruise control systems are also known. These systems have sensors, whose operation relates to the longitudinal guidance of the vehicle, in particular. Typical sensors are based on radar and lidar technology.

SUMMARY OF THE INVENTION

The vehicle according to the present invention has the advantage over the related art that, even when it is intended for the vehicle to turn, this situation is signaled to the driver by a warning or notification signal and/or—given the existence of a motion-state actuator in the vehicle, such as an ESP system (electronic stability program)—there is even the possibility of acting on the motion state of the vehicle and thus avoiding accidents or situations which are dangerous to the vehicle operator and/or the occupants and those otherwise involved.

Furthermore, it is advantageous that the motion-state actuator is activatable as a function of a steering angle and a yaw rate and the motion-state actuator is activated in the event of a lack of compatibility of the steering angle and the yaw rate. In this way, following the lane is assisted during an intervention of the motion-state actuator, i.e., an ESP intervention, for example.

Furthermore, it is advantageous that the motion-state actuator is also activated in the event of compatibility of the steering angle and the yaw rate. In this way it is possible to change the motion state of the vehicle even if a vehicle stability limit range has not yet been reached. The motion-state actuator is activated solely by the detection of leaving the roadway and the roadway is reached again without a critical situation occurring, due to which a motion-state actuator, such as in an ESP system, is activated solely due to reaching a vehicle stability limit range.

Furthermore, it is advantageous that the information detected by the sensor is provided for activating the motion-state actuator so that it works toward preventing the vehicle encountering obstacles and/or so that leaving the lane, which is detected with the aid of the sensor, is avoided. In this way it is possible to make the knowledge about objects in the environment, which is obtained by the environmental sensor system, useful for the electronic stability program or for warning the driver and/or the vehicle operator. In the simple case, the electronic stability program only includes stationary objects here, in an expansion, moving objects, such as approaching vehicles, may also be taken into consideration, which requires a more precise prediction of their movement in addition to the detection, however. The knowledge about the objects, e.g., data about location, distance, and differential speed between the objects and the vehicle, is made available by the environmental sensor system. In this way, it is therefore possible, above and beyond the input of the driver, to assist avoidance of obstacles and/or to avoid a collision during the intervention of the electronic stability program in the motion state of the vehicle.

Furthermore, it is advantageous that the vehicle has a driver command detector, the driver command detector being provided for detecting at least one driver command, the activation of the motion-state actuator being at least partially cancelable or reducible in its effect in the event of detection of a driver command which is at least partially opposed to the activation of the motion-state actuator. In this way, it is possible to manually overrule the intervention provided by the motion-state actuator.

DETAILED DESCRIPTION

Figure 1:
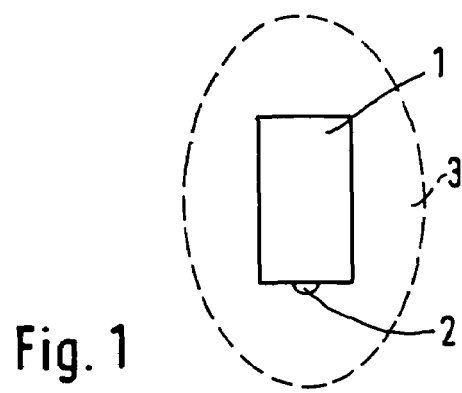
FIG. 1 shows a motor vehicle according to the present invention with its vehicle environment.
Figure 3:
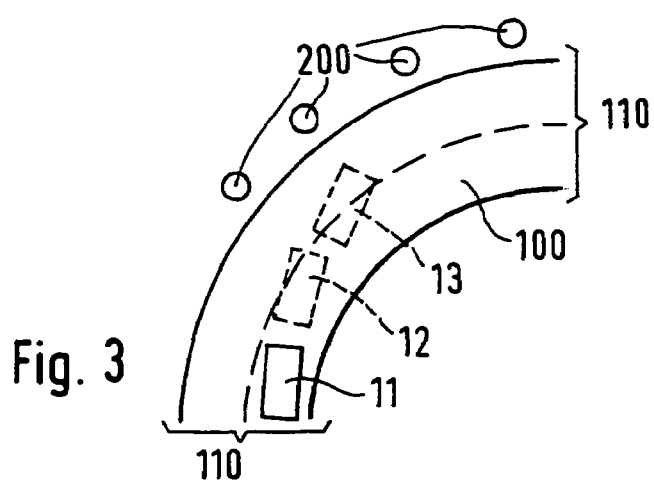
FIG. 3 shows a section of road having a traffic situation for using the vehicle according to the present invention.

A vehicle 1 according to the present invention is illustrated in FIG. 1 with its vehicle environment 3 (region delimited with dashed line). Vehicle 1 includes a sensor 2 for monitoring vehicle environment 3. Sensor 2 includes, for example, a radar and/or video sensor system. Sensor 2 is used for picking up information from vehicle environment 3 and/or the surroundings of the vehicle. In this case, the lanes and other objects described in connection with FIG. 3 are detected by sensor 2 in particular. According to the present invention, multiple identical or different sensors in particular are used as sensor 2.

Figure 2:
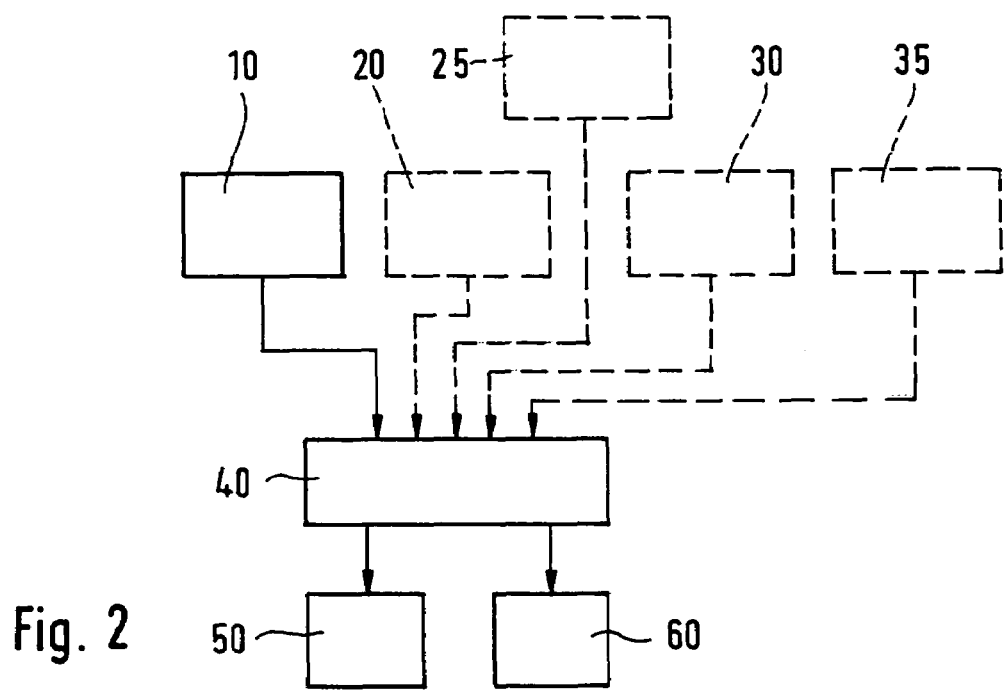
FIG. 2 shows a block diagram of the information processing in a vehicle according to the present invention.

A block diagram of the information processing in vehicle 1 according to the present invention is illustrated in FIG. 2. Sensor 2 provides information 10, which is transmitted to a processing unit 40. For this purpose, sensor 2 is connected to processing unit 40. Processing unit 40 analyzes information 10 and relays it to a motion-state actuator 50 and/or to a notification device 60. Processing unit 40 is connected to both motion-state actuator 50 and notification device 60 for this purpose. According to the present invention, motion-state actuator 50 and notification device 60 may be provided alternately or complementarily to one another, i.e., according to the present invention, a vehicle is provided both so that it has only motion-state actuator 50 or notification device 60, or so that it has both motion-state actuator 50 and notification device 60. Motion-state actuator 50 is implemented as an actuator which acts on the brakes in particular, but may also be provided as an accelerating actuator, as an active intervention in the engine controller, for example. Notification device 60 is provided in particular as a signaling means for warning information and/or notification information to be communicated to the driver and/or the vehicle operator.

Alternately or complementarily, vehicle 1 according to the present invention also includes a speed sensor 20, a motion state detector 30, and a driver command detector 35. For this purpose, speed sensor 20, motion state detector 30, and driver command detector 35 are each connected to the processing unit, if necessary. Furthermore, vehicle 1 includes a turn signal detector 25, which is also connected to processing unit 40, for the processing of the information about whether turning off is intended, for example, whether a turn signal is set or not.

The following scenarios are then conceivable according to the present invention: if turn signal detector 25 detects a set turn signal and therefore a desire to turn off, information 10 having a pattern such that processing unit 40 detects traffic which obstructs a turning-off action, either a warning signal is output using notification device 60 or a braking intervention is performed using motion-state actuator 50. However, if a motion-state actuator 50, i.e., a braking intervention capability, for example, is provided in vehicle 1, in any case the driver and/or the vehicle operator is given the ability to manually overrule and/or override the braking intervention performed automatically using motion-state actuator 50. Driver command detector 35 is provided for this purpose. This detector is implemented as a switch, for example, which a driver may operate so that the braking intervention automatically executed using motion-state actuator 50 is not executed or is only executed in a weakened form. Such a switch may, for example, also be implemented in such a way that, in the event of the existence or the announcement of an automatic braking intervention, an increased pressure on the gas pedal or even another sensor or detector which expresses the wish to accelerate is used as driver command detector 35.

In another embodiment of the present invention, vehicle 1 assists in following the lane during an automatic intervention of motion-state actuator 50. For this purpose, the degree of following the lane is concluded from information 10, which sensor 2 supplies to processing unit 40. If processing unit 40 comes to the conclusion from information 10 that the vehicle has left the lane, motion-state actuator 50 and/or notification device 60 are also activated, as in the situation described above. In this case, motion-state actuator 50 is provided as an ESP (electronic stability program) in particular, which is also activated if vehicle 1 is in a vehicle stability limit range. In particular, according to the present invention, the motion-state actuator is to be activated both if such a vehicle stability limit range has already been reached or even if a vehicle stability limit range has not yet been reached, but information 10 signals that vehicle 1 has left the lane and/or threatens to leave the lane. A predictive electronic stability program results from these last alternatives through the use of the environmental sensor system, i.e., sensor 2. The steering turn angle and the rate of rotation of the vehicle about the vertical axis and/or the yaw rate are important input variables for the electronic stability program. Therefore, these two variables play a large role in answering the question of whether or not a vehicle stability limit range has been reached. Motion state detector 30 therefore determines these two variables in particular, together with the speed of vehicle 1, and uses them to judge whether they are compatible with one another or not. In the event of compatibility, by definition there is no vehicle stability limit situation; in the event of an incompatibility, there is a vehicle stability limit situation.

The driver may additionally be assisted for the situation of turning off vehicle 1 across the lane of the oncoming traffic. If, for example, a wish to turn off across the oncoming lane is detected from the set turn signal and the lane information, it is thus calculated, from information 10 of sensor 2, i.e., from the environmental sensor system, whether there is a probability of collision with oncoming vehicles. If vehicle 1 is stationary, the driver is notified of this probability of collision, in particular via notification device 60. In addition, vehicle 1 may be held in place by an active braking intervention, which may, however, be overruled by the driver, i.e., by activating motion-state actuator 50. Such a braking intervention and/or an intervention of motion-state actuator 50 is canceled again upon disappearance of the collision danger. If the driver wishes to drive off in spite of oncoming traffic, he may be additionally warned of this by notification device 60. In this way, it is possible to assist the driver in a targeted way as he crosses the oncoming lane and, in particular, to provide help in heeding right-of-way rules at traffic signals and/or in the region of intersections. This offers a high potential for avoiding accidents, because accident statistics confirm that a greatly elevated risk of accidents exists precisely in the regions of intersections and/or at traffic signals. The intersection assistant according to the present invention uses information 10 of sensor 2 from vehicle environment 3 to recognize traffic signals and their status, to detect stop and yield signs, and to help the driver by warning using notification device 60 and/or through graduated braking interventions using motion-state actuator 50.

A roadway 110, which follows a curve, is illustrated in FIG. 3. Roadway 110 includes a lane 100 on which a vehicle 11, 12, 13 according to the present invention is located, the illustration of the vehicle assigned to reference number 11 being illustrated using solid lines in FIG. 3, while the illustration of the vehicle assigned to reference numbers 12 and 13 is illustrated using dashed lines. This is to make it clear that the illustration of the vehicle provided with reference numbers 12 and 13 indicates the stopping locations of the vehicle at later times. As may be seen from this, the vehicle has left its lane 100 and is moving toward an obstacle 200 located outside roadway 110. Obstacle 200 indicates, for example, a tree or something similar. Through the consideration of information 10, which is provided by sensor 2, according to the present invention, it is possible to also take such obstacles 200 into consideration when motion-state actuator 50 intervenes in the motion state of vehicle 1.

What is claimed is:

1. A device, comprising:
   at least one sensor for detecting a vehicle environment; and
   a movement state actuator for acting on a movement state of a vehicle in the event of an activation of the movement state actuator, wherein:
   the movement state actuator is a brake of the vehicle,
   a desire of a driver of the vehicle to turn off, on the basis of which a crossing of a lane of a roadway is to be expected, is recognized from a lane information of the lane of the roadway and a signal indicating the driver's desire to turn off,
   a collision probability with an on-coming vehicle is calculated from information detected by the at least one sensor, and
   the movement state actuator is activated if the collision probability with an on-coming vehicle was determined in the event of a recognized desire to turn off.

2. The device as recited in claim 1, further comprising:
   a notification device for signaling one of a notification and a warning to the driver of the vehicle in the event of an activation of the notification device, wherein:
   the information detected by the at least one sensor is provided for activating the notification device when one of:
   the vehicle leaves at least one of a predetermined lane and a changing lanes, and
   a turning off the vehicle is intended in the event of traffic that obstructs one of a lane change and a turning-off action.

3. The device as recited in claim 1, wherein:
   the movement state actuator is activatable as a function of a steering angle and a yaw rate, and the movement state actuator is activated in the event of a lack of compatibility of the steering angle and the yaw rate.

4. The device as recited in claim 1, further comprising:
a driver command detector for detecting at least one driver command, wherein:
the activation of the movement state actuator is one of at least partially cancelable and partially reducible in an effect thereof in the event of a detection of a driver command that is at least partially opposed to the activation of the movement state actuator.

5. The device as recited in claim 3, wherein:
the movement state actuator is activated in the event of a compatibility of the steering angle and the yaw rate.

6. The device as recited in claim 3, wherein:
the information detected by the at least one sensor is provided for the activation of the movement state actuator so that the movement state actuator works toward preventing the vehicle from encountering an obstacle.

7. A device, comprising:
at least one sensor for detecting a vehicle environment; and
a notification device for signaling one of a notification and a warning to a driver of a vehicle in the event of an activation of the notification device, wherein:
a desire of the driver of the vehicle to turn off, on the basis of which a crossing of a lane of a roadway is to be expected, is recognized from a lane information of the lane of the roadway and a signal indicating the driver's desire to turn off, in order to produce a recognized desire to turn off,
a collision probability with an on-coming vehicle is calculated from information detected by the at least one sensor, and
the notification device is activated if the collision probability with an on-coming vehicle was determined in the event of the recognized desire to turn off.

* * * * *